United States Patent
Anisimovich et al.

(10) Patent No.: US 11,568,140 B2
(45) Date of Patent: Jan. 31, 2023

(54) OPTICAL CHARACTER RECOGNITION USING A COMBINATION OF NEURAL NETWORK MODELS

(71) Applicant: ABBYY Development Inc., Dover, DE (US)

(72) Inventors: Konstantin Anisimovich, Moscow (RU); Aleksei Zhuravlev, Yaroslavl (RU)

(73) Assignee: ABBYY DEVELOPMENT INC., Raleigh, NC (US)

( * ) Notice: Subject to any disclaimer, the term of this patent is extended or adjusted under 35 U.S.C. 154(b) by 4 days.

(21) Appl. No.: 17/105,023

(22) Filed: Nov. 25, 2020

(65) Prior Publication Data
US 2022/0164533 A1    May 26, 2022

(51) Int. Cl.
*G06F 40/20*  (2020.01)
*G06F 40/279*  (2020.01)
*G06V 30/194*  (2022.01)
*G06V 10/88*  (2022.01)
*G06K 9/62*  (2022.01)

(52) U.S. Cl.
CPC ......... *G06F 40/279* (2020.01); *G06K 9/6267* (2013.01); *G06V 10/88* (2022.01); *G06V 30/194* (2022.01)

(58) Field of Classification Search
CPC .... G06F 40/279; G06K 9/6267; G06V 10/88; G06V 30/194
See application file for complete search history.

(56) References Cited

U.S. PATENT DOCUMENTS

| | | | |
|---|---|---|---|
| 10,445,569 | B1 | 10/2019 | Lin et al. |
| 10,671,878 | B1 | 6/2020 | Sarshogh et al. |
| 2018/0240013 | A1 | 8/2018 | Strope et al. |
| 2019/0180154 | A1 | 6/2019 | Orlov et al. |

(Continued)

FOREIGN PATENT DOCUMENTS

| | | |
|---|---|---|
| CN | 109993040 A | 7/2019 |
| CN | 112163596 * | 9/2020 |
| CN | 111967470 A | 11/2020 |

OTHER PUBLICATIONS

Machine translation for CN 112163596 (Year: 2020).*

(Continued)

*Primary Examiner* — Qian Yang
(74) *Attorney, Agent, or Firm* — Lowenstein Sandler LLP (57) ABSTRACT

Embodiments of the present disclosure describe a system and method for optical character recognition. In one embodiment, a system receives an image depicting text. The system extracts features from the image using a feature extractor. The system applies a first decoder to the features to generate a first intermediary output. The system applies a second decoder to the features to generate a second intermediary output, wherein the feature extractor is common to the first decoder and the second decoder. The system determines a first quality metric value for the first intermediary output and a second quality metric value for the second intermediary output based on a language model. Responsive to determining that the first quality metric value is greater than the second quality metric value, the system selects the first intermediary output to represent the text.

20 Claims, 9 Drawing Sheets

(56) References Cited

U.S. PATENT DOCUMENTS

2019/0279614 A1* 9/2019 Ye .................. G10L 15/187
2020/0026951 A1 1/2020 Chowdhury et al.

OTHER PUBLICATIONS

Neural Network, Wikipedia, last edited Oct. 28, 2020, https://ru.wikipedia.org/wiki/Нейронная_сеть, 16 pages.

Long short term memory, Wikipedia, last edited Mar. 25, 2020, https://ru.wikipedia.org/wiki/Долгая_краткосрочная_память, 5 pages.

Convolutional neural network, Wikipedia, last edited Apr. 22, 2020, https://ru.wikipedia.org/wiki/Свёрточная_нейронная_сеть, 6 pages.

Connectionist temporal classification, Wikipedia, last edited Sep. 15, 2020, https://en.wikipedia.org/wiki/Connectionist_temporal_classification, 1 page.

Graves et al., Connectionist Temporal Classification: Labelling Unsegmented Sequence Data with Recurrent Neural Networks, IDSIA, Manno-Lugano, Switzerland, 2006, 8 pages.

An intuitive explanation for the connectionist temporal classification, Jun. 20, 2018, https://www.machinelearningmastery.ru/intuitively-understanding-connectionist-temporal-classification-3797e43a86c/, 5 pages.

Narayanan, Praveen, Preparameterization trick, Praveen's Blog, Jan. 6, 2020, https://pravn.wordpress.com/, 42 pages.

Comparison of deep-learning software, Wikipedia, last edited Nov. 23, 2020, https://en.wikipedia.org/wiki/Comparison_of_deep-learning_software, 4 pages.

Bahdanau et al., Neural Machine Translation by Jointly Learning to Align and Translate, ICLR 2015, 15 pages.

* cited by examiner

OPTICAL CHARACTER RECOGNITION USING A COMBINATION OF NEURAL NETWORK MODELS

CROSS REFERENCE TO RELATED APPLICATIONS

This application claims the benefit of priority to Russian patent application No. 2020138343, filed Nov. 23, 2020, which is hereby incorporated by reference in its entirety.

TECHNICAL FIELD

The present disclosure is generally related to computer systems, and is more specifically related to systems and methods for optical character recognition using a combination of neural network models.

BACKGROUND

Artificial neural networks are computing systems that model biological neural networks. Such systems are trainable to solve various problems by looking at ready-made examples. They are most often used in applications that may be difficult to solve by a traditional computer algorithm.

SUMMARY OF THE DISCLOSURE

Embodiments of the present disclosure describe a system and method for optical character recognition of hand printed text using neural network models. In one embodiment, a system receives an image depicting texts. The system extracts a plurality of features from the image using a feature extractor. The system applies a first decoder to the plurality of features to generate a first intermediary output. The system applies a second decoder to the plurality of features to generate a second intermediary output, wherein the feature extractor is common to the first decoder and the second decoder. The system determines a first quality metric value for the first intermediary output and a second quality metric value for the second intermediary output based on a language model. The system determines that the first quality metric value is greater than the second quality metric value. Responsive to determining that the first quality metric value is greater than the second quality metric value, the system selects the first intermediary output to represent the texts.

BRIEF DESCRIPTION OF THE DRAWINGS

The present disclosure is illustrated by way of example, and not by way of limitation, and can be more fully understood with reference to the following detailed description when considered in connection with the Figures in which.

DETAILED DESCRIPTION

Optical character recognition may involve processing an input image to extract a set of features that represent the input image and processing the extracted features by a decoder (represented by a trainable model) that yields a line of text depicted by the image. In some implementations, the trainable model can be represented by a neural network.

A neural network is a computational model simulating a set of connected components called artificial neurons (similar to axons in the biological brain). Each connection (synapse) between neurons can transmit a signal to another neuron. The receiving (postsynaptic) neuron can process the signal and then transmit this signal to downstream neurons. Neurons can have a state, usually expressed by real numbers between 0 and 1. Neurons and synapses may also have a weight that changes as training progresses, which may increase or decrease the strength of the signal they send to the next neurons. In addition, they can have a threshold function, so only the signal that is above (or below) this threshold will be transmitted further.

Neurons may be organized in layers. Different layers can perform different types of transformations on their inputs. Signals move from a first (input) layer to the last (output) layer through several hidden layers, such as a multilayer perceptron.

Neural networks can be applied for implementing deep learning models. Deep learning is a set of machine learning algorithms that attempt to model high level abstractions in data using architectures consisting of many nonlinear transformations, in other words, to identify "hidden features".

Recurrent neural networks (RNN) is a type of neural network with cyclic connections between its units. These cycles create a concept of 'internal memory' for the network. The connections between its units form a directed sequence. The internal memory of RNN allows sequences of arbitrary length to be processed to generate corresponding variable length output sequences.

RNN can be used to process a series of events in time or sequential spatial chains. Unlike multilayer perceptrons, recurrent networks can use their internal memory to process sequences of arbitrary length. Therefore, RNN networks are applicable in tasks where something is completely divided into segments, such as handwriting recognition or speech recognition. Many different architectural solutions have been proposed for recurrent networks, from simple to complex. Recently, networks with long-term and short-term memory (LSTM) have become the most widespread.

Convolutional neural network (CNN) model may be used for pattern recognition tasks. The approach of convolutional neural networks is to alternate convolutional layers (convolution layers) and down-sampling layers (down-sampling layers or pooling layers). The network structure is unidirectional (without feedbacks) and essentially multi-layered.

Standard methods are used for training, most often using a method of error back propagation and different activation functions for the neurons (transfer function) may be picked for particular tasks. The CNN architecture is distinguished by the presence of a convolution operation, the essence of which is that each image fragment is multiplied by the convolution matrix (core) element by element, and the result is summed and written to the same position of the output image.

As noted herein above, the input image can be processed to extract a set of features that represent the input image. The extracted features can then be processed by a text recognition decoder, which may be represented by a trainable model that yields a line of text depicted by the image.

LSTM and CNN can be used as building blocks for text recognition decoder designs. In some implementations, a text recognition decoder can be implemented by a connectionist temporal classification (CTC) decoder, which includes the building blocks of a CNN, a LSTM, and a CTC loss function, as further described below.

In other implementations, a text recognition decoder can be implemented by an attention based encoder-decoder, which includes the building blocks of a CNN, a LSTM (encoder), and a LSTM (decoder), as further described below. The two decoders are designed differently leading to different hypothesis (guesses) for text recognitions.

Advantageously, using both decoders simultaneously may improve an overall quality of the text recognition. The quality may be improved because these decoders may generate different results given the same inputs (because these decoders are different and have different building blocks arrangements) and the best result may be selected to improve the quality of the text recognition. Sharing different building blocks of these decoders may further reduce a processing requirement to execute the two decoders.

Various aspects of the above referenced methods and systems are described in details herein below by way of examples, rather than by way of limitation.

Figure 1:
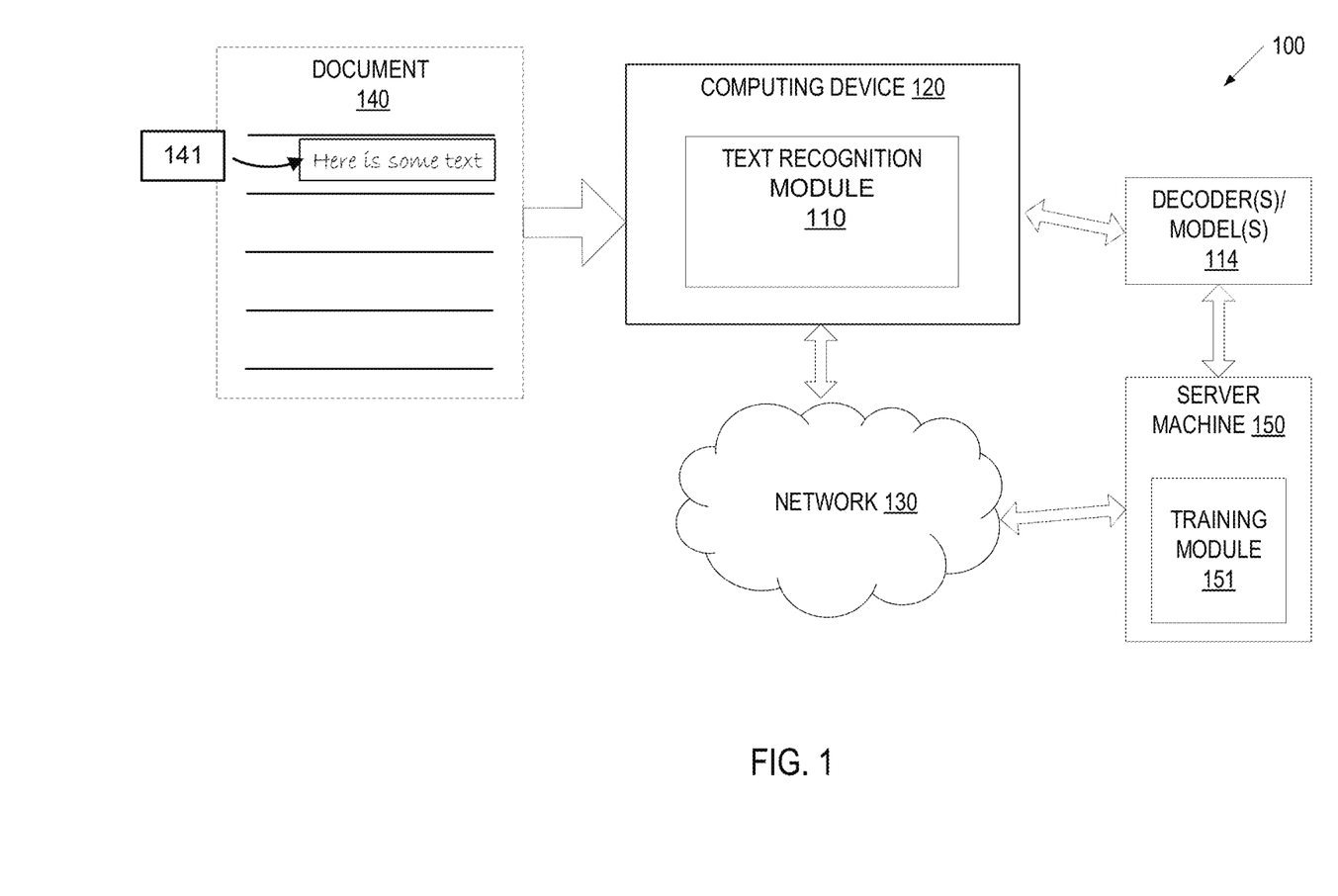
FIG. 1 depicts a high level system diagram of a system architecture in accordance with one or more aspects of the present disclosure.

FIG. 1 depicts a high level system diagram of a system architecture in accordance with one or more aspects of the present disclosure. System architecture 100 includes a computing device 120, and a server machine 150 connected to a network 130. Network 130 may be a public network (e.g., the Internet), a private network (e.g., a local area network (LAN) or wide area network (WAN)), or a combination thereof.

The computing device 120 may perform character recognition using trainable classifiers (such as neural network) to effectively recognize texts including one or more sentences. A recognized sentence may include one or more words. A recognized word may include one or more characters (symbols).

The computing device 120 may be a desktop computer, a laptop computer, a smartphone, a tablet computer, a server, a scanner, or any suitable computing device capable of performing the techniques described herein. A document 140 including written text may be received by the computing device 120. It should be noted that text printed or handwritten in any language may be received. The document 140 may include one or more sentences each having one or more words that each has one or more characters.

The document 140 may be received, for example, by scanning the document 140 or photographing the document 140. Thus, an image 141 of the text including the sentences, words, and characters included in the document 140 may be obtained. Additionally, in instances where the computing device 120 is a server, a client device connected to the server via the network 130 may upload a digital copy of the document 140 to the server. In instances where the computing device 120 is a client device connected to a server via the network 130, the client device may download the document 140 from the server.

The image of text 141 may be used to train a set of machine learning models or may be a new document for which recognition is desired. Accordingly, in the preliminary stages of processing, the image 141 of text included in the document 140 can be prepared for training the set of machine learning models or subsequent recognition. For instance, in the image 141 of the text, text lines may be manually or automatically selected, characters may be marked, text lines may be normalized, scaled and/or binarized.

Additionally, during preprocessing, the text in the image 141 obtained from the document 140 may be divided into fragments (e.g., words) of text. As depicted, a line is divided into fragments of text automatically on gaps having a certain color (e.g., white) that are more than threshold amount (e.g., 10) of pixels wide. Selecting text lines in an image of text may enhance the processing speed when recognizing the text by processing shorter lines of text concurrently, for example, instead of one long line of text. The preprocessed and calibrated images 141 of the text may be used to train a set of machine learning models or may be provided as input to a set of trainable machine learning models to determine the most probable text.

The computing device 120 may include a text recognition module 110. Text recognition module 110 may be a software module executable by one or more general purpose and/or specialized hardware devices. Text recognition module 110 may include instructions stored on one or more tangible, machine-readable media of the computing device 120 and executable by one or more processing devices of the computing device 120. In an implementation, the text recognition module 110 may use trainable decoders or machine learning models 114 that are trained and used to recognize one or more string of characters/symbols from the text in the image 141. The text recognition module 110 may also preprocess any received images prior to using the images for training or inferencing based on one of the decoder(s)/ models 114. In some instances, the decoders/models 114 may be part of the text recognition module 110 or may be accessed on another machine (e.g., server machine 150) by the text recognition module 110. Based on the output of the trainable decoders/machine learning models 114, the text recognition module 110 may extract one or more predicted sentences from text in the image 141.

Server machine 150 may be a rackmount server, a router computer, a personal computer, a portable digital assistant, a mobile phone, a laptop computer, a tablet computer, a camera, a video camera, a netbook, a desktop computer, a media center, or any combination of the above. The server machine 150 may include a training module 151. The decoders/machine learning models 114 may refer to model artifacts that are created by the training module 151 using the training data that includes training inputs and corresponding target outputs (correct answers for respective training inputs). The training module 151 may find patterns in the training data that map the training input to the target output (the answer to be predicted), and provide the decoders/machine learning models 114 that capture these patterns.

Figure 2:
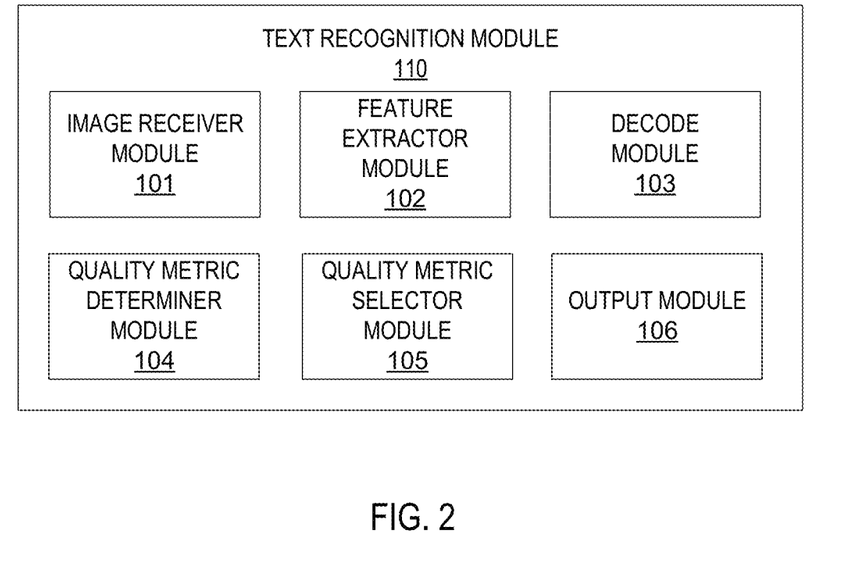
FIG. 2 depicts a block diagram of an example text recognition module in accordance with one or more aspects of the present disclosure.

FIG. 2 depicts a block diagram of an example text recognition module in accordance with one or more aspects of the present disclosure. Text recognition module 110 may be a software module running on computing device 120 of FIG. 1. In one embodiment, text recognition module 110 can include image receiver module 101, feature extractor module 102, decode module 103, quality metric determiner module 104, quality metric selector module 105, and output module 106. One or more of modules 101-106, or a combination thereof, may be implemented by one or more software modules running on one or more hardware devices.

Image receiver module 101 can receive a document image for optical character recognition (OCR). The image can be a document file, or a picture file with visible text. The image may be derived from various media outlets (such as printed or handwritten paper documents, banners, posters, signs, billboards, and/or other physical objects with visible texts on one or more of their surfaces. In one embodiment, image receiver module 101 can pre-processed the image by applying one or more image transformation to the image, e.g., binarization, size scaling, cropping, color conversions, etc. to prepare the image for OCR. In another embodiment, the pre-processing may segment the image into image fragments (images with visible words) for further processing.

Feature extractor module 102 can extract one or more features from an image. The features may be individual measurable properties or characteristics of a perceivable visual aspect of the image. In one embodiment, feature extractor 102 includes a rule-based feature extractor, or a convolutional neural network for feature extraction. Decode module 103 can decode the extracted features by using two or more decoders (such as a CTC or an attention decoder), the decoders to extract and decode output symbols from the features. Quality metric determiner module 104 can assign a quality metric value to output symbols of a particular decoder. Quality metric selector module 105 can compare the quality metric values among the output symbols of two or more decoders and select the output symbols with the highest quality metric value. Output module 106 can output the selected sets of symbols. Although modules 101-106 are shown separately, some of modules 101-106, or functionalities thereof, may be combined.

Figure 3A:
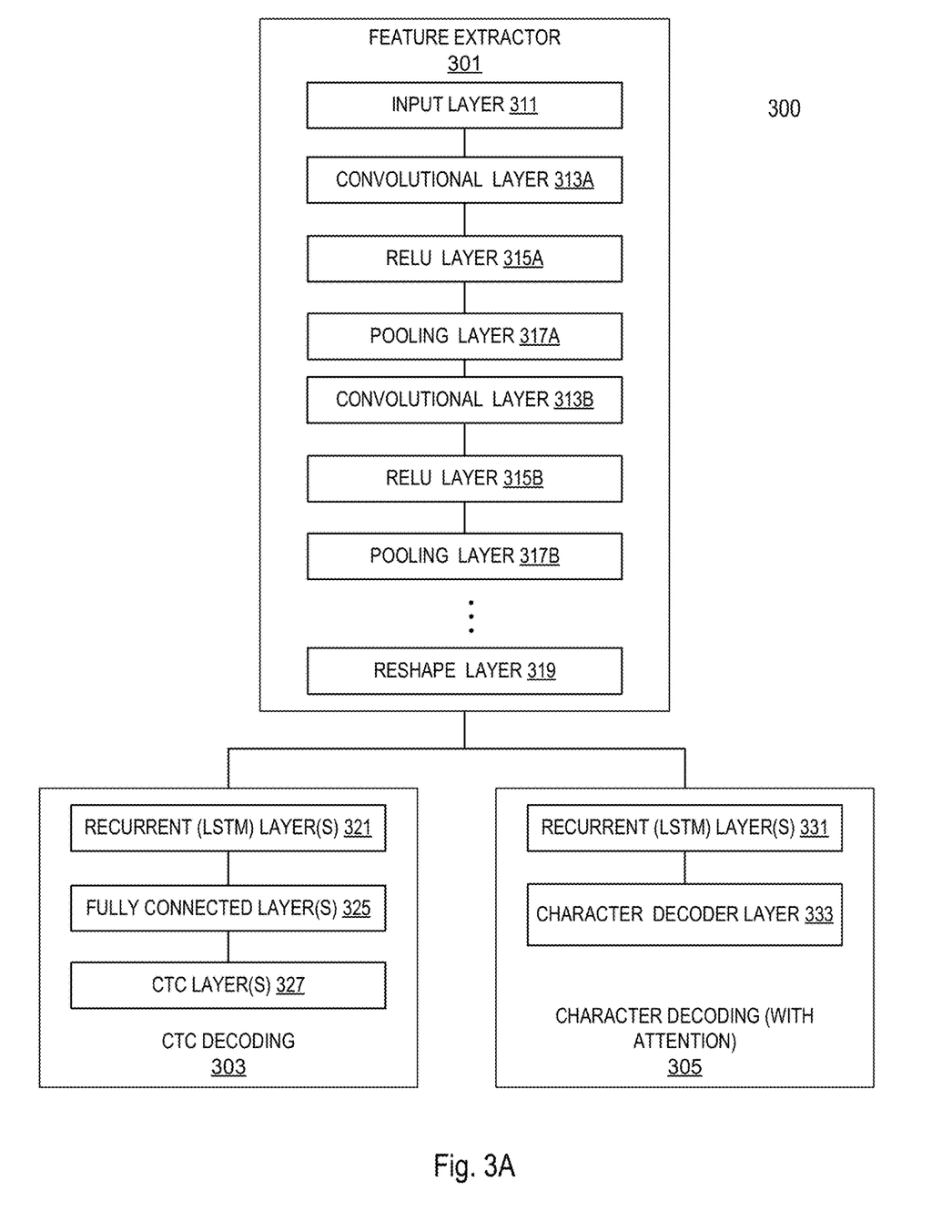
FIGS. 3A-3B illustrate block diagrams of hybrid CTC-attention decoders in accordance with one or more aspects of the present disclosure.

FIG. 3A illustrates a block diagram of a hybrid decoder in accordance with one or more aspects of the present disclosure. Decoder 300 may be a single hybrid decoder that can decode text in an image and output symbols representing the text. Decoder 300 may be trained by server machine 150 and provided to computing device 120 to be used by computing device 120. E.g., decoder 300 may be one of decoders/models 114 of FIG. 1. In one embodiment, decoder 300 includes feature extractor 301, connectionist temporal classification (CTC) decoder 303, and character decoder 305. Feature extractor can extract features from an input image with text. The feature may be encoded and CTC decoder 303 may decode the encoded based on the CTC decoding, as further described below. The feature extractor 301 may include a CNN model used to extract features from the input image. The extracted features may be numeric vectors that represents text patterns found in the input image. Character decoder (with attention) 305 can decode the input image with text based on word character decoding with an attention mechanism, as further described below.

Referring to FIG. 3A, in one embodiment, feature extractor 301 may be implemented by a convolutional neural network with a sequence of layers of different types, such as convolutional layers, pooling layers, rectified linear unit (ReLU) layers, and fully connected layers, each of which may perform a particular operation in optical character recognition. As illustrated, feature extractor 301 may include an input layer 311, one or more convolutional layers 313A-313B, ReLU layers 315A-315B, pooling layers 317A-317B, and a reshape (or output) layer 319.

In some embodiments, an input image may be received by the input layer 311 and may be subsequently processed by a series of layers of feature extractor 301. Each of the convolution layers may perform a convolution operation which may involve processing each pixel of an input image by one or more filters (convolution matrices) and recording the result in a corresponding position of an output array. One or more convolution filters may be designed to detect a certain image feature, by processing the input image and yielding a corresponding feature map.

The output of a convolutional layer (e.g., convolutional layer 313A) may be fed to a ReLU layer (e.g., ReLU layer 315A), which may apply a non-linear transformation (e.g., an activation function) to process the output of the convolutional layer. The output of the ReLU layer 315A may be fed to the pooling layer 317A, which may perform a down-sampling or subsampling operation to decrease the resolution and the size of the feature map. The output of the pooling layer 317A may be fed to the convolutional layer 313B.

Processing of the image by the feature extractor 301 may iteratively apply each successive layer until every layer has performed its respective operation. As schematically illustrated by FIG. 3A, the feature extractor 301 may include alternating convolutional layers and pooling layers. These alternating layers may enable creation of multiple feature maps of various sizes. Each of the feature maps may correspond to one of a plurality of input image features, which may be used for performing optical character recognition.

In some embodiments, the pooling layer 317B, which may be represented by a fully connected layer, of the feature extractor 301 may produce a feature vector representative of the features of the original image, which may be regarded as a representation of the image in the multi-dimensional space of image features.

The feature vector may be fed to the reshape layer 319. Reshape layer 319 may apply a matrix transformation to the feature vector to flatten the feature vector into a feature array for CTC and/or word character decoding. Note that, various alternative implementations of feature extractor 301 may include any suitable numbers of convolutional layers, ReLU layers, pooling layers, and/or any other layers. In addition, batch normalization and dropout layers may be applied to improve training, and decrease a chance of overfitting, respectively.

Referring to FIG. 3A, in one embodiment, CTC decoding 303 includes recurrent layer(s) 321, fully connected layer 325, and CTC layer 327. The recurrent layer(s) 321 can include one or more gated recurrent units (GRU) or long short-term memory (LSTM) networks, or other variations of the RNN. In some embodiments, the recurrent layer(s) 321 may be unidirectional or bidirectional. In one embodiment, after the recurrent layer(s) 321, one or more fully connected layer(s) 325 are applied. The fully connected layer(s) 325 may include a softmax layer. The fully connected layer(s) 325 can output to one or more CTC layer(s) 327, which includes a CTC decoder or CTC loss function. CTC layer(s) 327 then generates a first decoded output, e.g., a first hypothesis of output symbols for the input image.

Connectionist temporal classification (CTC) is a type of neural network output and associated scoring function, for training recurrent neural networks (RNNs) such as LSTM networks to solve sequence problems where the number of spatial observations is variable. CTC refers to the outputs and scoring, and is independent of the underlying neural network structure. That is to say, the CTC loss function can be trained with any types of neural networks. The trained CTC loss function can then be used to decode feature maps to obtain the text contained in a corresponding image.

For CTC, the input data can be a sequence of observations (or spatial intervals), and the output data can be a sequence of symbols, which may include blank output data, such that one output symbol corresponds to one observation. Recognizing an individual output symbol is essentially classifying an instance of observation as a class (symbol) from a set of classes (symbols). For example, to recognize a word composed of any of the 26 alphabets (symbols), the CTC symbols can be predefined to 26 symbols for the 26 alphabets plus a blank '-', which totals to 27 symbols. The blanks are removed at the time of decoding. The purpose of the blank is to solve the variability in the spatial intervals issue. That is, CTC encoding is time invariant and since a particular alphabet may be recognized in multiple spatial observations, the output may contain repetition of the particular character. The decoding process performs a CTC decoding algorithm to remove any character repetitions, e.g., "aa"→"a", "aabbc"→"abc", while the blanks effectively preserves an intended character repetition, e.g., "to-o"→"too". An example of a neural network based on CTC loss function is shown in FIG. 4.

Referring to FIG. 3A, in one embodiment, character decoding 305 includes recurrent layer(s) 331 and character decoder layer 333. In one embodiment, recurrent layer(s) 331 may include one or more GRU, or LSTM networks, or other variations of RNN. In one embodiment, recurrent layer(s) 331 may have similar components but with different trained weights than recurrent layer(s) 321. Character decoder layer 333 can include a word decoder layer with an attention mechanism. The attention mechanism is a way to instruct the network of which observations to pay more attention to. For example, an attention layer may identify factors based on the training sample that reduce network error. Identification of these factors (or input nodes to the attention layer) can be performed during training through forward and backward propagation. An example of the structure of a neural network based on attention for recognition tasks is shown in FIG. 5.

Figure 3B:
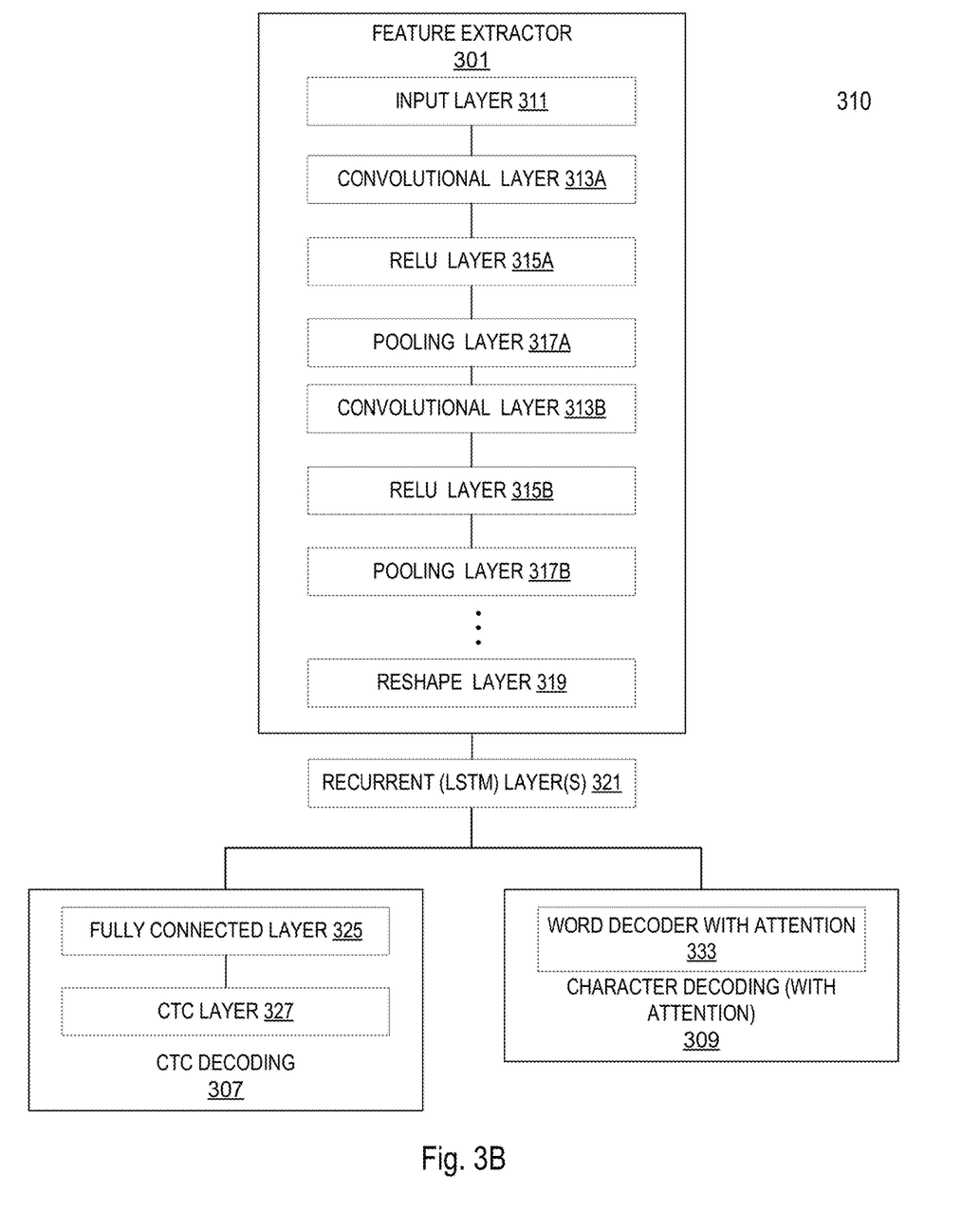

FIG. 3B illustrates a block diagram of a hybrid decoder in accordance with one or more aspects of the present disclosure. Decoder 310 may be similar to decoder 300 but the recurrent (LSTM) layers 321 is shared or common to the CTC decoding 307 and character decoding 309 layers, e.g., the output of recurrent layers 321 serves as inputs for both CTC decoding 307 and character decoding 309 layers. In one embodiment, the recurrent (LSTM) layers 321 include LSTM layers. Here, the recurrent layers 321 with respect to the CTC decoder is a CTC encoder that is time invariant. The recurrent layers 321 can act, under the encoder-decoder word prediction scheme, as an encoder with respect to the character decoder. The combined recurrent layer 321 may be trained to serve dual functions, the function of a CTC encoder and the function of an encoder for the encoder-decoder word prediction. Recurrent layers 321 common to both decoders can reduce processing operations and memory requirements since only one set of encoding output is generated.

Figure 4:
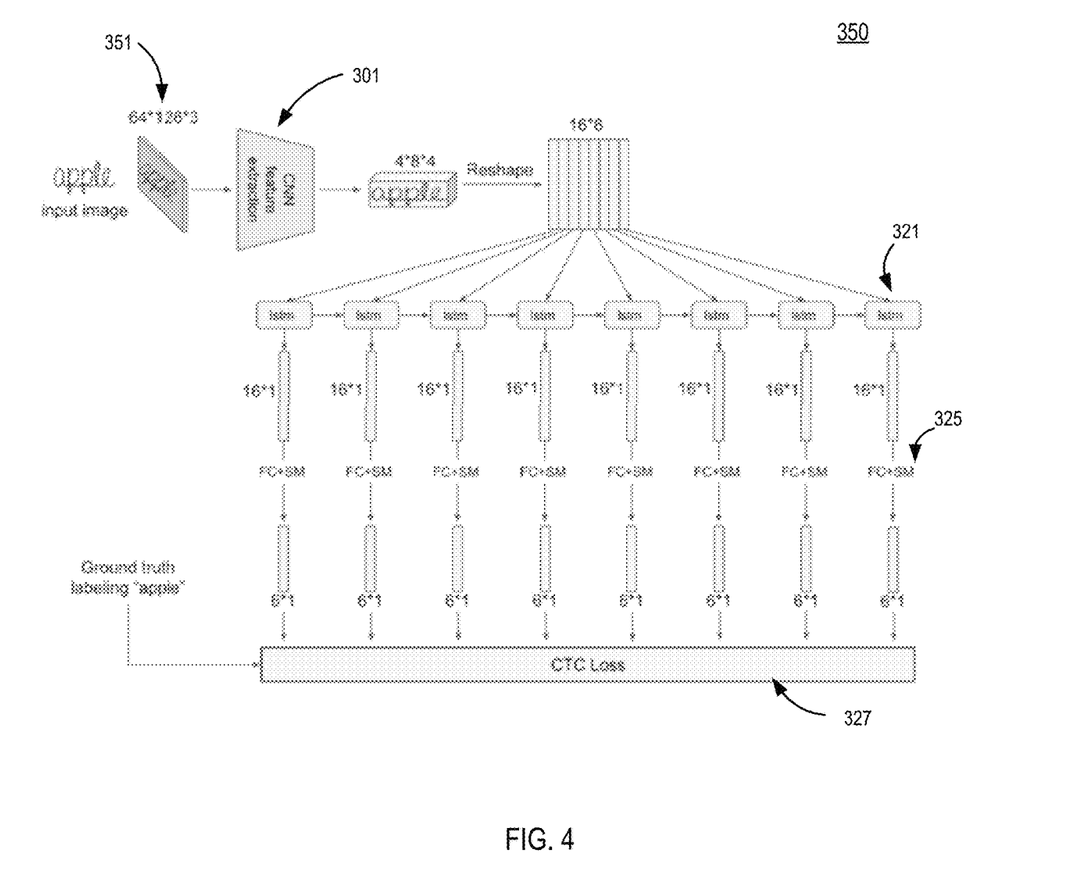
FIG. 4 illustrates an example block diagram of a connectionist temporal classification (CTC) decoder in accordance with one or more aspects of the present disclosure.

FIG. 4 illustrates an example block diagram of a connectionist temporal classification (CTC) decoder in accordance with one or more aspects of the present disclosure. Decoder 350 may represent a combination of feature extractor 301 and CTC decoding 303 of FIG. 3A. In one embodiment, decoder 350 receives an input image 351 with text "apple" for OCR. The input image may have dimensions of 64×128×3, e.g., 64 by 128 pixels with 3 color channels. The input image is fed to feature extractor 301 to extract feature maps from the input image through various convolutional, ReLU, and pooling (e.g., down sampling) layers. The output of the feature extractor 301 here provides a 4×8×4 feature map. The 4×8×4 feature map may be reshaped by a reshape layer (not shown) to a dimension of 16×8. The 16×8 feature map (8 spatial observations) is provided for the recurrent (LSTM) layers 321 (CTC encoding) to generate 8 output feature maps of dimension 16×1. The dimension of 16×1 is bounded by hyperparameters of the LSTM units, e.g., size and uni-directionality or bi-directionality. Bidirectional LSTMs are an extension of unidirectional LSTMs that can improve model performance on sequence classification problems. In this example, a current LSTM unit 321 receives an input spatial observation and generates an output feature map and a network state (internal memory). The network state is used as an input by a next LSTM unit 321. The 8 output feature maps with dimensions 16×1 may pass through one or more fully connected layers (with softmax) 325 to generate 8 outputs of dimensions 6×1. Here, each of the 6×1 output represents an output symbol. An example sequence of output symbols may be "aap-plee", where each symbol corresponding to one of the 8 spatial observations. The CTC loss layer 327 then decodes the symbols and converts the symbols to an output. In this example, repeated symbols "aa" and "ee" may appear in the encoding output because the first two spatial observations may have inferred an "a" and the last two spatial observations may have inferred an "e". CTC loss layer 327 then applies a CTC decoding algorithm to the output sequence of layers 325 by first removing repeated symbols, followed by removing any blanks in the sequence, i.e., "aap-plee"→"ap-ple"→"apple". Although FIG. 4 illustrates an example network with 8 observations for the LSTM layer or recurrent layer 321, any number of LSTM observations is possible. Note that the number of observations should be greater than a length of the predicted sequence of symbols. Note that the image/feature dimensions and the characters "apple" in this example are for illustrative purposes only and various implementations can include various image/feature dimensions and image texts.

Figure 5:
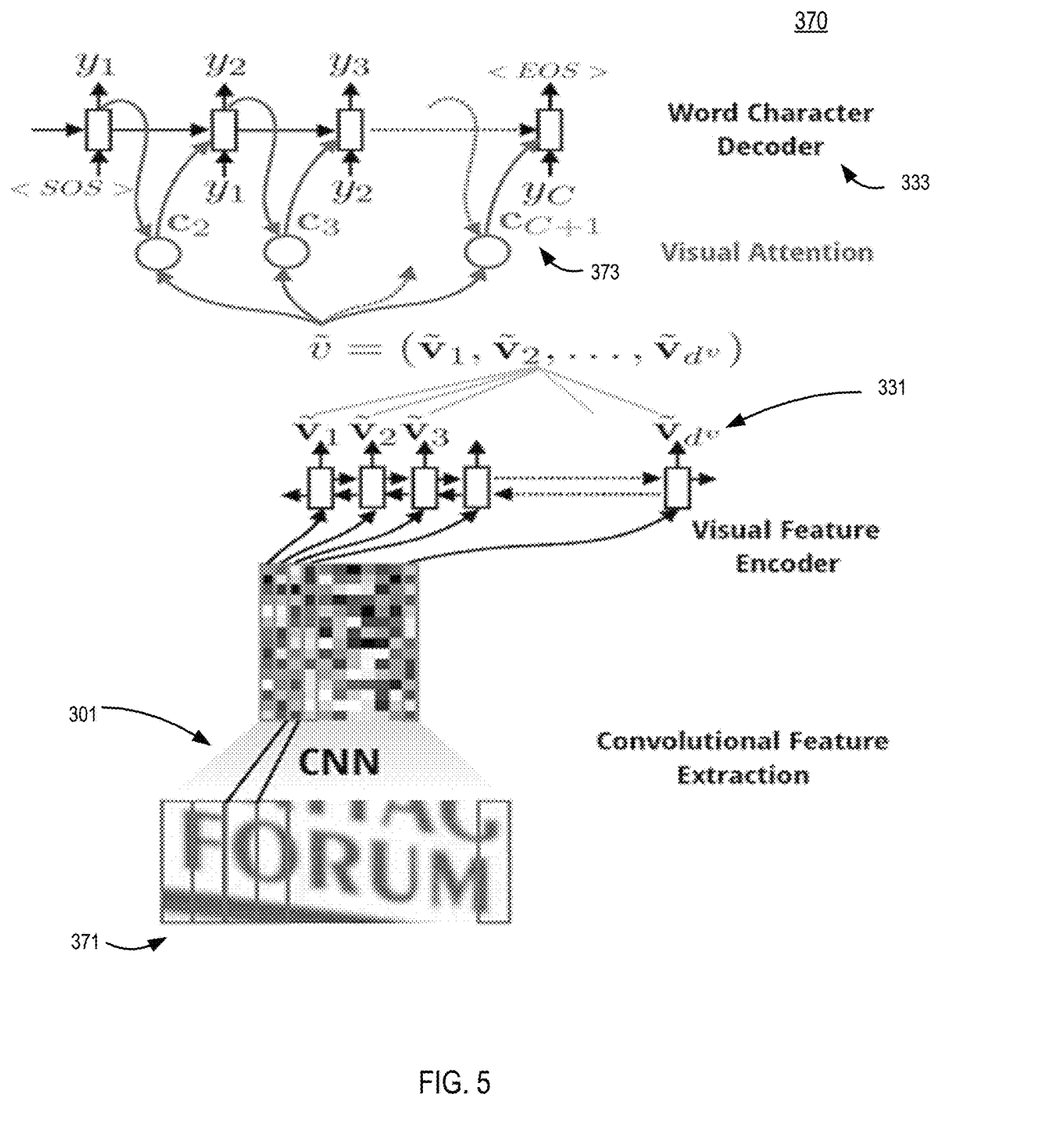
FIG. 5 illustrates an example block diagram of an attention decoder in accordance with one or more aspects of the present disclosure.

FIG. 5 illustrates an example block diagram of an attention decoder in accordance with one or more aspects of the present disclosure. Decoder 370 may represent feature extractor 301 and character decoding 305 of FIG. 3A. Decoder 370 may use the encoder-decoder scheme with attention, where one or more recurrent layers (such as recurrent layers 331 of FIG. 3A) is used as the encoder component and one or more recurrent layers (such as character decoder layer 333 of FIG. 3A) is used as the decoder component of the encoder-decoder scheme. Referring to FIG. 5, in one embodiment, decoder 370 receives an input image 371 with text "forum" for OCR. The input image is provided to feature extractor 301 to extract feature maps from the input image through various convolutional, ReLU, and pooling (e.g., down sampling) layers. The feature map outputs are provided to recurrent layer 331, e.g., visual feature encoder, to encode the feature maps into an intermediary representation, e.g., sequence $\tilde{v}$. The intermediary representation is then decoded into output symbols y. Note that there are two special symbols: (SOS) start of sequence and (EOS) end of sequence in the output symbols, which denote the start and the end of the output symbols, respectively. The EOS solves the issue that the output sequence of symbols may have a different length than the observations in the recurrent layers. In one embodiment, the character decoder layer 333 includes one or more recurrent layers (e.g., LSTM) to perform the decoding. The character decoder layer 333 may be directional or bidirectional. In one embodiment, an output symbol is decoded based on an input from a corresponding intermediary representation. In another embodiment, the character decoder includes an attention mechanism. Here, an output symbol is decoded based on a context of a plurality of intermediary representation. For example, inferencing an input image may produce the intermediary representation, e.g., sequence 13. At each spatial observation, the character decoding layer may choose one or more most interesting input observations based on the latest output. In one embodiment, a context vector 373 is generated to represent the attention mechanism. That is, context vector 373 represents which portion of the intermediary representation is most interesting for the decoder at an observation. In one embodiment, the context vector includes a binary vector for each observation, e.g., the decoding process determines which of the intermediary representations are to be considered. In one embodiment, the context includes a weighted vector for each observation, e.g., the decoding process determines how much weight of which of the intermediary representations are to be considered.

Figure 6:
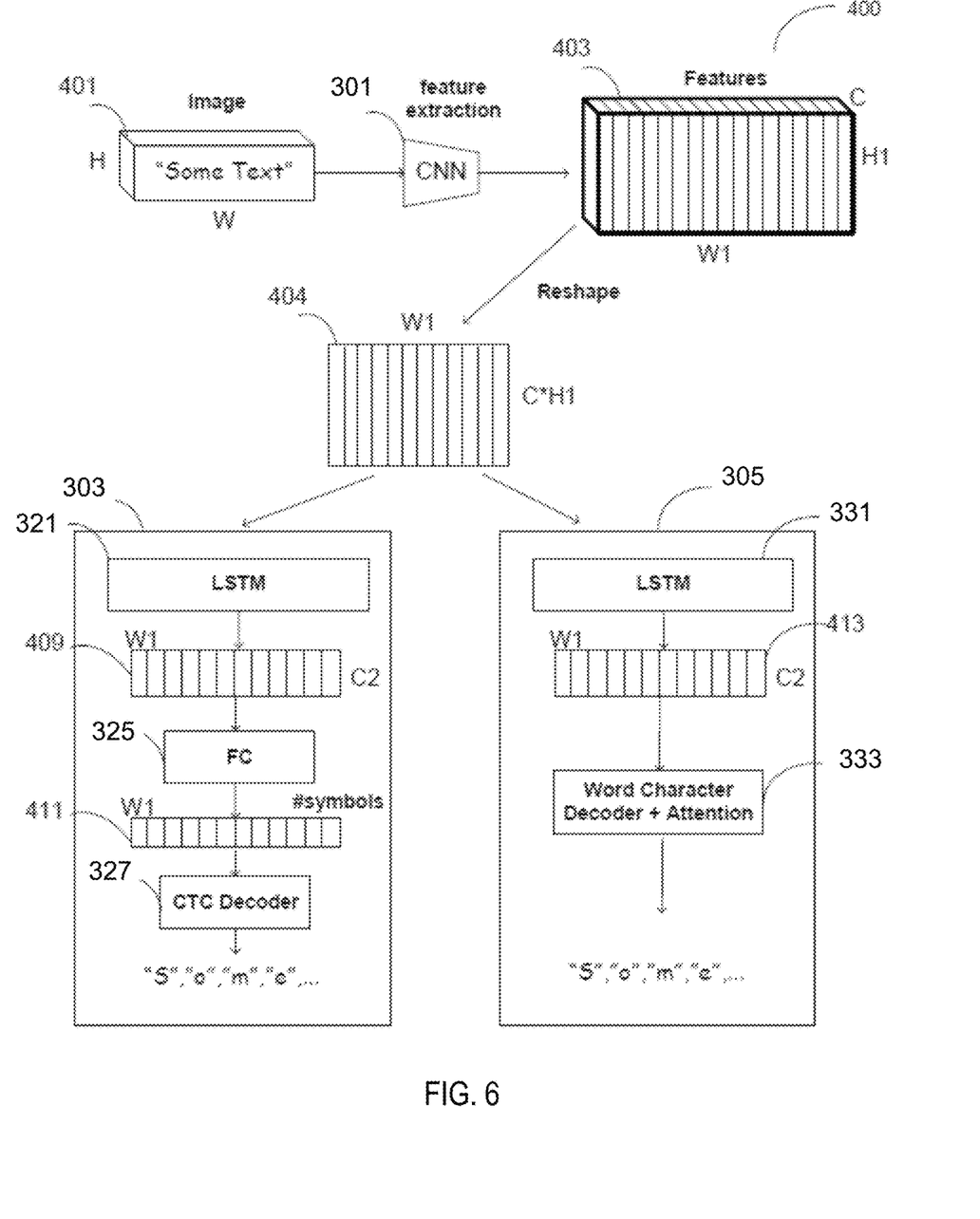
FIG. 6 illustrates an example block diagram of a hybrid CTC-attention decoder in accordance with one or more aspects of the present disclosure.

FIG. 6 illustrates an example block diagram of a hybrid CTC-attention decoder in accordance with one or more aspects of the present disclosure. Decoder 400 may represent decoder 300 of FIG. 3A. Referring to FIG. 6, decoder 400 may be a hybrid CTC-attention decoder with CTC decoding and character decoding with attention that shares a common CNN feature extractor, e.g., common to the CTC decoding and the character decoding. In one embodiment, decoder 400 receives an input image 401 with text "Some text" for OCR. Image 401 may be preprocessed to dimensions H×W, where H is a height, and W is a width of image 401. Image 401 may be passed through CNN 301 for features extraction to generate array of features (feature map) 403 of dimensions H1×W1×C, where H1 is a height, W1 is a width, and C is a channel for features 403. The extracts features 403 is reshaped to features 404 with dimensions W1 by C*H1. Here, the reshape transformation can flatten a three-dimensional (3D) feature map into a 2D feature map. Next, feature map 404 is provided to both CTC decoding 303 and character decoding 305. Referring to CTC decoding 303, feature map 404 is provided to one or more LSTM layers 321 to generate intermediary representations 409 with dimensions W1×C2. Note that, the C2 value is only bound to the LSTM hyperparameters (size and directionality). For example, if a bidirectional LSTM layer 321 of size 100 is used, then C2=2*100=200. If a unidirectional LSTM layer 321 of size 128 is used, then C2=1*128=128. If all spatial observations of the input sequence are available, as in the instant example, bidirectional LSTMs include two trainable LSTM units instead of one LSTM unit. The first LSTM is trained using the initial input sequence and the second LSTM is trained using a reversed copy of the input sequence. This can provide additional context to the network and result in a faster training session.

The intermediary representations 409 are provided to fully-connected layer(s) 325. The fully-connected layer 325 performs another convolution operation by multiplying the intermediary representations 409 by a matrix of trainable weights (not shown). In one embodiment, the output can be a softmax layer 411 that outputs a probability of performing one of the actions from the set of all possible actions. The disadvantage of this architecture is that it is difficult to implement the choice of several simultaneous actions at once. In another embodiment, the softmax layer 411 is a sequence of W1 vectors (or a matrix with W1 columns), and each column contains a set of probabilities corresponding to a set of symbols. In one embodiment, the set of probabilities in a column is normalized, i.e. the sum of the probabilities for a column is 1. The set of symbols, with a size="#symbols", includes all valid text recognition characters, e.g., letters, numbers, separators, etc. plus a special "-" character called blank, which will be used by the CTC decoder 327. The softmax layer 411, with dimensions W by #symbols, is passed through CTC decoder 327 to generate a first set of output characters (symbols) representative of the text in input image 401. Note that CTC decoder 412 performs a CTC decoding algorithm that removes repeated characters followed by blanks '-', if any.

Referring to character decoding 305, feature maps 404 are provided to one or more LSTM layers 331 to generate intermediary representations 413 of dimensions W1×C2. Attention-based character decoding uses a different special character: EOS in the intermediary representations 413, which indicates the end of the sequence. Thus, LSTM layers 331 can generate a sequence with an EOS indicator. Intermediary representations 413 is provided to character decoder with attention 333 and a character decoding algorithm is applied to generate a second set of output characters/symbols representative of the text in input image 401. Here, the character decoding algorithm of character decoding 333 determines the location of the EOS character and removes any characters after the EOS character.

In one embodiment, the first set of output characters and the second set of characters are each passed through a language model (not shown) to determine a first and a second quality metric for the first and second set of output characters, respectively. Quality metric value refers to a ranking of how polished the sequence of output characters/symbols is. If the first quality metric value is greater than the second quality metric value, the first set of output characters is determined to be the output of the hybrid decoder 400, and vice versa. In one embodiment, the language model includes a rule-based model based on dictionary, morphological model of inflection, a syntactic model, or statistics on the compatibility of letters and/or words, or a combination thereof. The quality metric value may be determined based on a counting mechanism of matching outputs for one or more of these rule-based models. For example, for a dictionary model, if the first set of output characters (a first word) matches a dictionary look up, the quality metric value for the first set of output characters increments by 1. Similarly, if the second set of output characters (a second word) matches a dictionary look up, the quality metric value for the second set of output characters increments by 1. In another example, a model based on statistics on the compatibility of letters may use a character compatibility table that indicates if some adjacent characters are compatible. Given a particular character, the character compatibility table may indicate which adjacent characters are frequently occurring, e.g., compatible and the adjacent characters. For each set of output characters, each character and its adjacencies in the set are looked up in the character compatibility table for a match. If a match exists, the quality metric value for the set increments by 1.

In another embodiment, the language model includes a trainable recurrent neural network (RNN) model (not shown). In another embodiment, the RNN model includes a self-attention mechanism as described above (not shown). Here, the RNN model may be trained to provide a quality metric value for a set of characters based on correctness of spelling of a word represented by the set of characters. For example, a RNN model may be trained for text classification to classify a sequence of characters into two classes: words with correct spelling and words with incorrect spelling. The training samples for the first class may use a dictionary and labeled the first class. The training samples for the second class can include randomly generated words that is not in the dictionary and labeled the second class. The trained RNN may infer a quality metric value based on a probability of the inferred class, e.g., the quality metric value may be the probability the word belongs to the first class. The self-attention mechanism may be similar to the attention mechanism for decoder 333.

Referring to FIG. 1, the above described decoders may be trained by server machine 150. Training module 151 of server machine 150 may be configured to train any of the decoders in FIGS. 3A-6. In one embodiment, referring to FIG. 3A, the hybrid CTC—attention decoder 300 may be trained as a single unit. For example, module 151 may train the CTC decoding 303 using a CTC loss function (as shown in FIG. 4) based on a CTC forward backward algorithm. Module 151 may simultaneously train character decoding 305 using forward and backward propagation. Here, input images and labels are prepared by an operator for training, e.g., input image with "apple" and two separate outputs "aap-plee" and "<sos>apple<eos>" for CTC decoding 303 and character decoding 305, respectively, may be provided as ground truths to train decoder 300. Here, <sos> represents start of sequence, and <eos> represents end of sequence.

For example, training module 151 may set up a number of convolutional layers for the feature extractor and a number of LSTM layers for the recurrent layers. Training module 151 may initialize random value for all parameters of the decoder network. Training module 151 may calculate a forward pass, e.g., pass the training instance through the network and obtain all symbol probabilities for each observation. For the CTC decoding, training module 151 may construct a table (for all possible paths for each possible sequence of the intermediary representation) to represent specific symbol sequences for each observation. Training module 151 may compute CTC forward and backward variables for the table and determine a divergence error for each symbol probability at each observation based on the CTC forward and backward variables. Based on the divergence error, training module 151 may update one or more weights in the LSTM and CNN layers.

In another embodiment, module 151 may train the CTC decoder portion of the hybrid CTC—attention decoder 300 separately from the attention-character decoder portion of the hybrid CTC—attention decoder 300. E.g., the CTC decoder portion (feature extractor 301 and CTC decoding 303) of 300 may be trained first. Once the weights are determined, module 151 trains the character decoding 305 to determine the weights for the layers in character decoding 305.

Referring to FIG. 3B, in one embodiment, the hybrid CTC—attention decoder 310 may be trained as a single unit by module 151. In another embodiment, module 151 may train the hybrid CTC—attention decoder 300 separately. I.e., the CTC decoder portion (feature extractor 301 and CTC decoding 303) of 300 is trained first, followed by the character decoding 309. Once a decoder is trained, the trainable decoder can be provided to a text recognition module for inference, such as text recognition module 110 of FIG. 1.

Figure 7:
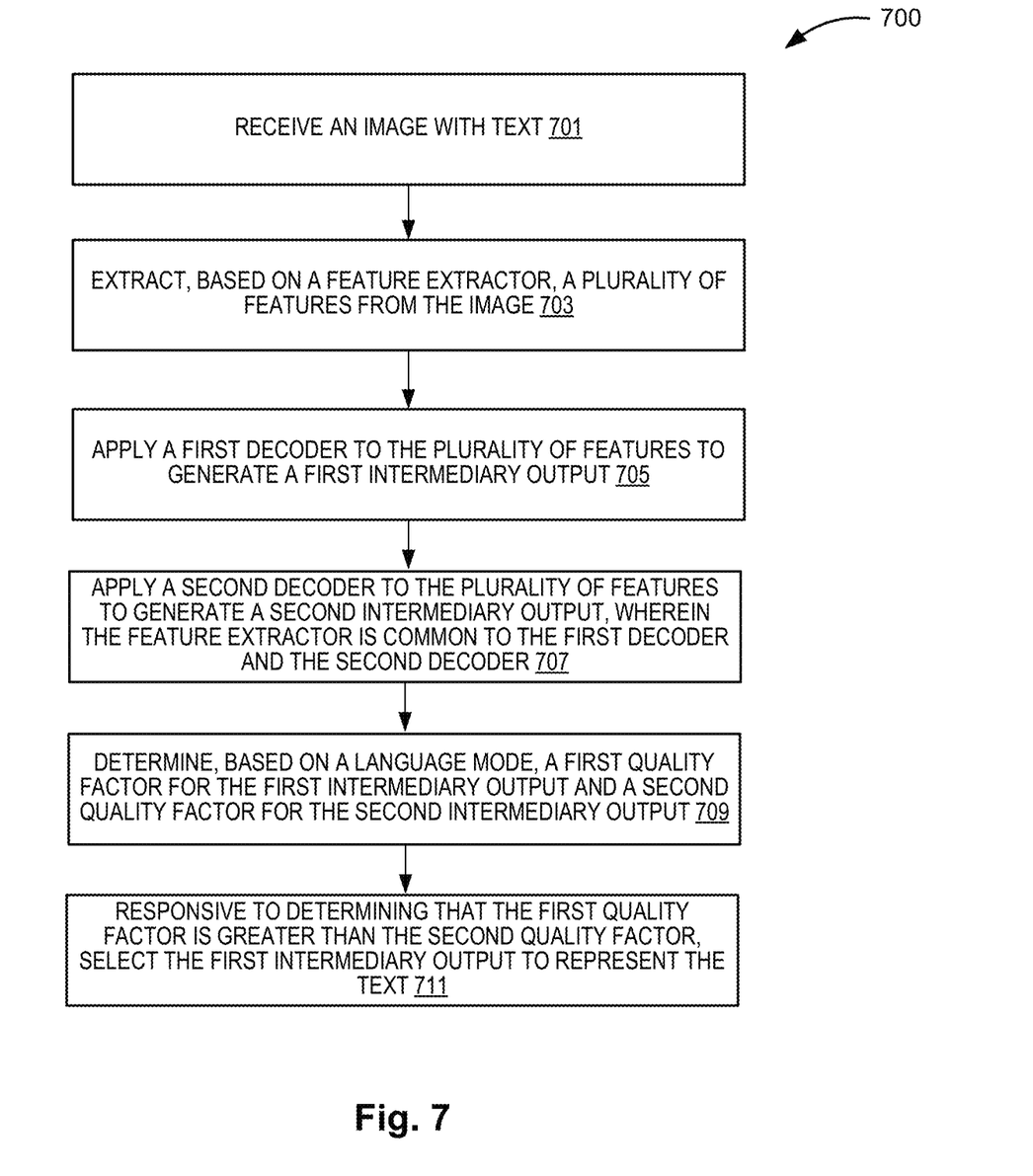
FIG. 7 depicts a flow diagram of a method for optical character recognition in accordance with one or more aspects of the present disclosure.

FIG. 7 depicts a flow diagram of a method for optical character recognition in accordance with one or more aspects of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 700 is performed by text recognition module of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 701, processing logic receives an image with text. At block 703, processing logic extracts a plurality of features from the image using a feature extractor. The feature extractor can be a trainable CNN model trained to extract the image features. The image features may be characteristics of the writing in the image that can be used for pattern recognition or machine learning classification. At block 705, processing logic applies a first decoder to the plurality of features to generate a first intermediary output. The first intermediary output may be a first hypothesis/guess for the sequence of perceivable characters in the image. At block 707, processing logic applies a second decoder to the plurality of features to generate a second intermediary output, where the feature extractor is common to the first decoder and the second decoder. The second intermediary output may be a second hypothesis/guess for the sequence of perceivable characters in the image. At block 709, processing logic determines a first quality metric value for the first intermediary output and a second quality metric value for the second intermediary output based on a language model. The language model can be a dictionary model, character compatibility model, etc. At block 711, responsive to determining that the first quality metric value is greater than the second quality metric value, processing logic selects the first intermediary output to represent the text.

In one embodiment, the first decoder includes a connectionist temporal classification decoder and the second decoder includes a character decoder with attention. In one embodiment, the first decoder includes a first long short-term memory component and the character decoder with attention includes a second long short-term memory component. In one embodiment, the first and the second decoder includes a long short-term memory component common to the first and the second decoder. In one embodiment, the first decoder and the second decoder is trained simultaneously with a connectionist temporal classification (CTC) loss function and an attention mechanism, respectively.

In one embodiment, the language model includes a dictionary, a morphological model of inflection, a syntactic model, or a model for statistical compatibility of letters or words. In one embodiment, the language model includes a recurrent neural network model with self-attention.

Figure 8:
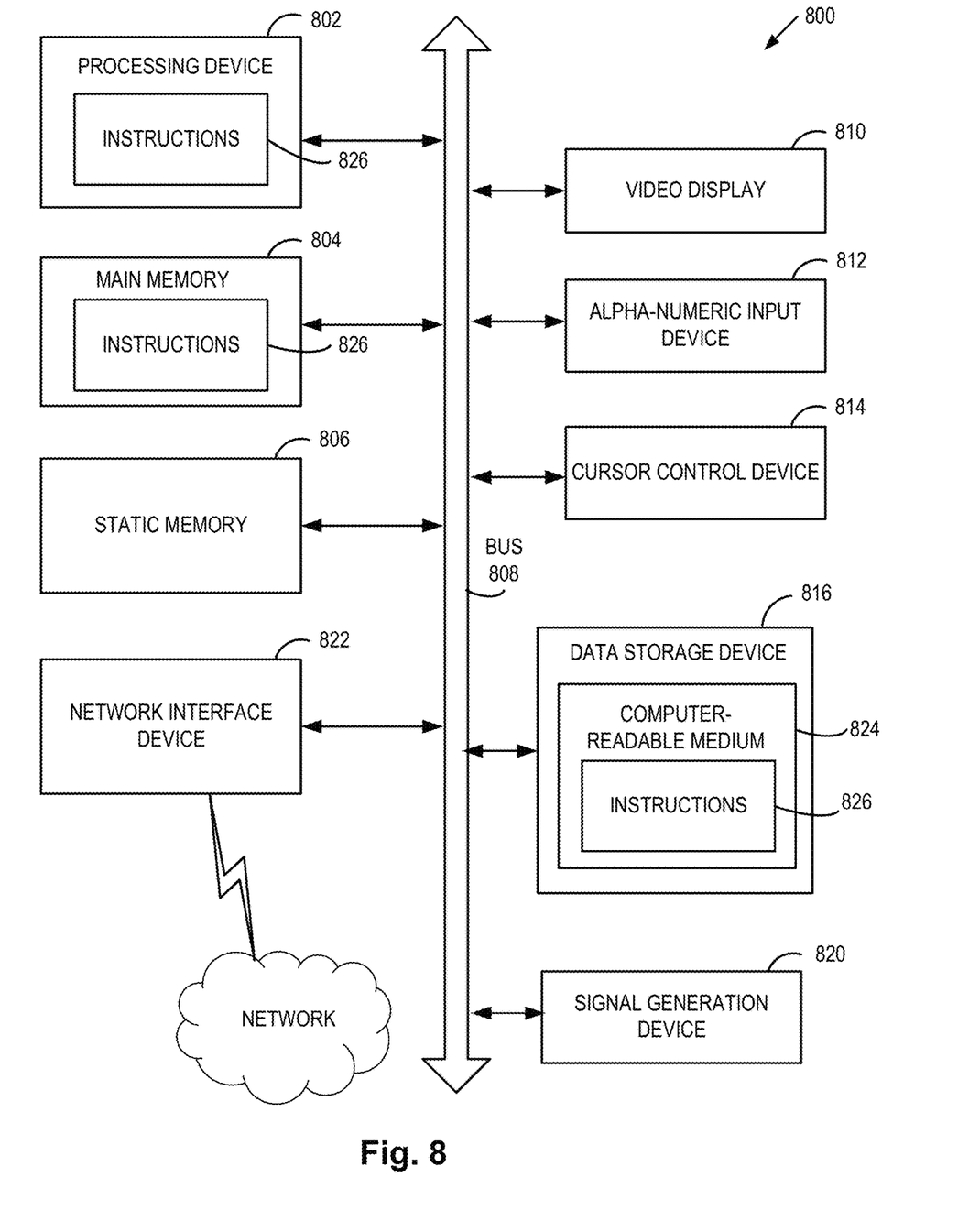
FIG. 8 depicts a block diagram of an illustrative computer system in accordance with one or more aspects of the present disclosure.

FIG. 8 depicts an example computer system 800 which can perform any one or more of the methods described herein. In one example, computer system 800 may correspond to a computing device 120 capable of executing text recognition module 110 of FIG. 1, or server machine 150 capable of executing training module 151 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 800 includes a processing device 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816, which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker). In one illustrative example, the video display unit 810, the alphanumeric input device 812, and the cursor control device 814 may be combined into a single component or device (e.g., an LCD touch screen).

The data storage device 816 may include a computer-readable medium 824 on which is stored instructions 826 (e.g., corresponding to the method of FIG. 7, etc.) embodying any one or more of the methodologies or functions described herein. Instructions 826 may also reside, completely or at least partially, within the main memory 804 and/or within the processing device 802 during execution thereof by the computer system 800, the main memory 804 and the processing device 802 also constituting computer-readable media. Instructions 826 may further be transmitted or received over a network via the network interface device 822.

While the computer-readable storage medium 824 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
   receiving, by a computer system, an image with text;
   extracting, by a feature extractor, a plurality of features from the image;
   applying a first decoder to the plurality of features to generate a first intermediary output;
   applying a second decoder to the plurality of features to generate a second intermediary output;
   determining, based on a language model, a first quality metric value for the first intermediary output and a second quality metric value for the second intermediary output; and
   responsive to determining that the first quality metric value is greater than the second quality metric value, selecting the first intermediary output to represent the text.

2. The method of claim 1, wherein the first decoder includes a connectionist temporal classification (CTC) decoder and the second decoder includes a character decoder with attention.

3. The method of claim 2, wherein the first decoder includes a first long short-term memory component and the character decoder with attention includes a second long short-term memory component.

4. The method of claim 3, wherein the first long short-term memory component is bidirectional.

5. The method of claim 2, wherein the first decoder and the second decoder include a long short-term memory component common to the first decoder and the second decoder.

6. The method of claim 1, wherein the language model includes at least one of: a dictionary, a morphological model of inflection, a syntactic model, or a model for statistical compatibility of letters or words.

7. The method of claim 1, wherein the language model includes a recurrent neural network model.

8. A system, comprising:
   a memory;
   a processor, coupled to the memory, the processor configured to:
   receive an image with text;
   extract, using a feature extractor, a plurality of features from the image;
   apply a first decoder to the plurality of features to generate a first intermediary output;
   apply a second decoder to the plurality of features to generate a second intermediary output, wherein the feature extractor is common to the first decoder and the second decoder;
   determine, based on a language model, a first quality metric value for the first intermediary output and a second quality metric value for the second intermediary output; and
   responsive to determining that the first quality metric value is greater than the second quality metric value, select the first intermediary output to represent the text.

9. The system of claim 8, wherein the first decoder includes a connectionist temporal classification (CTC) decoder and the second decoder includes a character decoder with attention.

10. The system of claim 9, wherein the first decoder includes a first long short-term memory component and the character decoder with attention includes a second long short-term memory component.

11. The system of claim 10, wherein the first long short-term memory component is bidirectional.

12. The system of claim 9, wherein the first decoder and the second decoder include a long short-term memory component common to the first decoder and the second decoder.

13. The system of claim 8, wherein the language model includes a dictionary, a morphological model of inflection, a syntactic model, or a model for statistical compatibility of letters or words.

14. The system of claim 8, wherein the language model includes a recurrent neural network model.

15. A computer-readable non-transitory storage medium comprising executable instructions that, when executed by a computer system, cause the computer system to:
- receive an image with text;
- extract, using a feature extractor, a plurality of features from the image;
- apply a first decoder to the plurality of features to generate a first intermediary output;
- apply a second decoder to the plurality of features to generate a second intermediary output, wherein the feature extractor is common to the first decoder and the second decoder;
- determine, based on a language model, a first quality metric value for the first intermediary output and a second quality metric value for the second intermediary output; and
- responsive to determining that the first quality metric value is greater than the second quality metric value, select the first intermediary output to represent the text.

16. The computer-readable non-transitory storage medium of claim 15, wherein the first decoder includes a connectionist temporal classification (CTC) decoder and the second decoder includes a character decoder with attention.

17. The computer-readable non-transitory storage medium of claim 16, wherein the first decoder includes a first long short-term memory component and the character decoder with attention includes a second long short-term memory component.

18. The computer-readable non-transitory storage medium of claim 17, wherein the first long short-term memory component is bidirectional.

19. The computer-readable non-transitory storage medium of claim 16, wherein the first decoder and the second decoder include a long short-term memory component common to the first decoder and the second decoder.

20. The computer-readable non-transitory storage medium of claim 15, wherein the language model includes a dictionary, a morphological model of inflection, a syntactic model, or a model for statistical compatibility of letters or words.

* * * * *